United States Patent
Droste et al.

(10) Patent No.: US 10,815,062 B2
(45) Date of Patent: Oct. 27, 2020

(54) SUPPLY DEVICE AND METHOD FOR PRODUCING A SUPPLY DEVICE

(71) Applicant: Interroll Holding AG, Sant' Antonino (CH)

(72) Inventors: Heinrich Droste, Sinsheim (DE); Siegmund Dudek, Heinsberg (DE)

(73) Assignee: Interroll Holding AG (CH)

( * ) Notice: Subject to any disclaimer, the term of this patent is extended or adjusted under 35 U.S.C. 154(b) by 0 days.

(21) Appl. No.: 16/490,062

(22) PCT Filed: Jan. 17, 2018

(86) PCT No.: PCT/EP2018/051095
§ 371 (c)(1),
(2) Date: Aug. 29, 2019

(87) PCT Pub. No.: WO2018/157991
PCT Pub. Date: Sep. 7, 2018

(65) Prior Publication Data
US 2020/0079591 A1    Mar. 12, 2020

(30) Foreign Application Priority Data
Mar. 2, 2017  (DE) .................. 10 2017 002 019

(51) Int. Cl.
*B65G 15/64*  (2006.01)
*B65G 23/44*  (2006.01)
(Continued)

(52) U.S. Cl.
CPC ............. *B65G 15/64* (2013.01); *B65G 15/12* (2013.01); *B65G 15/46* (2013.01); *B65G 15/50* (2013.01);
(Continued)

(58) Field of Classification Search
CPC ........ B65G 15/12; B65G 15/46; B65G 15/50; B65G 15/64; B65G 23/04; B65G 23/44; B65G 39/07; B65G 39/071; B65G 39/16
See application file for complete search history.

(56) References Cited

U.S. PATENT DOCUMENTS 3,627,108 A * 12/1971 Hansen ............... B65G 15/50
198/600
4,561,538 A * 12/1985 Zwiebel ............. B65G 23/44
198/816

(Continued)

FOREIGN PATENT DOCUMENTS

| CN | 205327984 | 6/2016 |
| EP | 0 560 480 | 9/1993 |

(Continued)

OTHER PUBLICATIONS

International Search Report dated Apr. 24, 2018.
(Continued)

*Primary Examiner* — Gene O Crawford
*Assistant Examiner* — Keith R Campbell
(74) *Attorney, Agent, or Firm* — Gerald E. Hespos; Michael J. Porco; Matthew T. Hespos

(57) ABSTRACT

A supply device is provided for laterally feeding of goods to be transported to a conveyor device (25). The supply device has a drive pulley (5), end pulleys (7) and conveyor belts (9). Each of the end pulleys (7) is associated with one of conveyor belts (9). Each of the conveyor belts (9) extends around the drive pulley (5) and the associated end pulley (7) and can be driven the drive pulley (5). A friction-enhancing element (41) is configured on the drive pulley (5) for enhancing friction between the respective conveyor belt (9) and the drive pulley (5).

12 Claims, 3 Drawing Sheets

(51) Int. Cl.
*B65G 39/16* (2006.01)
*B65G 23/04* (2006.01)
*B65G 15/12* (2006.01)
*B65G 15/46* (2006.01)
*B65G 15/50* (2006.01)

(52) U.S. Cl.
CPC ............ *B65G 23/04* (2013.01); *B65G 23/44* (2013.01); *B65G 39/16* (2013.01)

(56) References Cited

U.S. PATENT DOCUMENTS

| | | | | |
|---|---|---|---|---|
| 5,213,202 | A * | 5/1993 | Arnold | A01F 15/18 198/835 |
| 5,507,382 | A | 4/1996 | Hartwell et al. | |
| 6,216,852 | B1 * | 4/2001 | David | B65G 15/08 198/847 |
| 6,811,018 | B2 * | 11/2004 | Cotter | B65G 15/22 198/460.1 |
| 7,232,029 | B1 * | 6/2007 | Benedict | B65G 15/00 198/814 |
| 7,467,704 | B2 * | 12/2008 | Vertogen | B65G 15/50 198/460.1 |
| 7,757,842 | B1 * | 7/2010 | Fortenbery | B65G 41/002 198/814 |
| 2011/0168527 | A1 * | 7/2011 | Fatato | B65G 15/50 198/601 |
| 2013/0153371 | A1 * | 6/2013 | Suttie | G07F 19/202 198/808 |

FOREIGN PATENT DOCUMENTS

| | | | | |
|---|---|---|---|---|
| EP | 0560480 | A2 * | 9/1993 | ............ B65G 17/08 |
| JP | 6-56258 | | 3/1994 | |

OTHER PUBLICATIONS

German Office Action dated Jun. 24, 2019.
English language translation of German Office Action dated Jun. 24, 2019.
European Office Action dated Apr. 2, 2020.

* cited by examiner

SUPPLY DEVICE AND METHOD FOR PRODUCING A SUPPLY DEVICE

BACKGROUND

Field of the Invention

The invention relates to a supply device for the lateral feeding of goods to be transported to a conveyor device, and to a method for providing a supply device for the lateral feeding of goods to be transported to a conveyor device.

Related Art

A supply device is employed to feed goods to be transported laterally to a conveyor device. Known supply devices may have insufficient friction between a conveyor belt and a drive pulley to drive the conveyor belt by means of the drive pulley, or in other words, the drive pulley slips under the conveyor belt.

To avoid this effect and the associated disadvantages, such as increased wear of the conveyor belt and/or of the drive pulley, as well as a transport error, it is an object of the present invention to provide an improved supply device that reduces transport errors.

SUMMARY

One aspect relates to a supply device for the lateral feeding of goods to be transported to a conveyor device. The supply device comprises a drive pulley, at least one end pulley and at least one conveyor belt. Each of the end pulleys is associated with one of the conveyor belts. The conveyor belt extends around the drive pulley and the respective end pulley and can be driven by the drive pulley. At least one friction-enhancing element is configured on the drive pulley for enhancing friction, in particular for enhancing static friction, between the respective conveyor belt and the drive pulley.

The supply device can be part of a feed-conveyor device, on which goods to be transported are conveyed for instance along a feed direction to a conveyor device. The goods to be transported can be conveyed along a conveying direction on the conveyor device. The supply device can also be configured as a discharge device, by way of which goods to be transported can be guided laterally away from the conveyor device.

The supply device can be installed at an angle to the conveyor device with an installation angle between the supply device and the conveyor device of e.g. less than about 90°. The installation angle can be between about 10° and about 90°, preferably between about 30° and about 60°.

The drive pulley can be at a first end of the supply device, and the first end may be approximately perpendicular to the feed direction. A second end of the supply device can be configured as a connecting section of the supply device, with which the supply device connects to the conveyor device and at which the at least one end pulley can be configured. In particular, the first end is arranged substantially opposite the second end, in particular the connecting section, with reference to the feed direction.

The connecting section can be configured at a connecting angle to the conveyor device other than about 90° to the feed direction, which advantageously adds up to about 90° with the installation angle. The connecting angle can be between about 30° and about 60°. The angular configuration of the connecting section can result in a feed conveyor surface that is no longer rectangular but is configured as a rectangle that has been elongated on one side. In this case, one side of the feed conveyor surface, which is on average arranged closer to the conveyor device and is configured substantially parallel to the feed direction, can be shorter than a side of the feed conveyor surface which is on average farther away from the conveyor device and is likewise substantially parallel to the feed direction. This shape of the feed conveyor surface requires either a conveyor belt having a different belt length on the shorter side compared to that on the longer side of the feed conveyor surface, or a division of the one conveyor belt into multiple conveyor belts arranged approximately parallel to each other and approximately parallel to the feed direction, with each having a different belt length. These conveyor belts of different lengths can be capable of being driven jointly by the one drive pulley. Depending on the width of the feed conveyor surface (perpendicular to the feed direction), a plurality of the conveyor belts, in particular arranged adjacently to each other, can have the same belt length or all the conveyor belts can have different belt lengths.

The friction-enhancing element can be configured as part of the drive pulley or as a separate component. Multiple friction-enhancing elements can be configured, e.g. at least one friction-enhancing element per conveyor belt.

An advantage of the present invention is the increased friction, in particular static friction, between drive pulley and conveyor belt due to the friction-enhancing element configured on the drive pulley, by means of which a slipping of the drive pulley under the conveyor belt and the associated disadvantages, such as e.g. transport errors, can be reduced.

Various materials, such as e.g. metals, are suitable for a casing of the drive pulley. In particular a wear-resistant and/or rigid material with a low moment of inertia is suitable for the drive pulley. These properties are exhibited by light metals and composite materials, and in particular the casing can be made of aluminum or a steel tube covered with polyurethane (PU), e.g. with a PU having a Shore hardness of, in particular at least, about 80 D. In combination with the guide strip of the conveyor belt, a coefficient of friction $\mu$, of about 0.1 is obtained. This allows a low-friction lateral guiding of the belt in the guide groove to be achieved. This low-friction guiding of the belt advantageously causes minimal wear and/or friction loss. Unfortunately, this low-friction combination does not provide adequate reliability for the transfer of the drive torque from the drive pulley to the running side of the conveyor belt. In a combination of the PU having a Shore hardness of, in particular at least, about 80 D with the at least one conveyor belt, which can be made of a polyvinyl chloride (PVC) on the carrying side and a polyester (PE) fabric on the running side, a friction index, in particular a coefficient of friction $\mu$, can be only about 0.15 to about 0.2 for a static friction between conveyor belt and drive pulley. In order to increase reliability of a transfer of the drive torque, greater friction is required. This can be achieved by a higher pre-tensioning of the conveyor belt and/or a greater coefficient of friction p between conveyor belt and drive drum. However, for a higher pre-tensioning, for example higher outlay on the tensioning device, a more rigid design of the drive drum and its bearing and/or a different belt material are required, and so a greater coefficient of friction $\mu$, in particular greater than 0.2, represents an economical and easy-to-install solution for a reliable transfer of the drive torque. An increase of the coefficient of friction $\mu$ at least in some areas, in particular in the area of the contact surface between drive pulley and running side of the conveyor belt, e.g. by friction-enhancing means, is capable of increasing reliability in the transfer of the drive torque.

The friction-enhancing element of certain embodiments is made of a soft material with a relatively high friction index, e.g. polyurethane (PU) with a Shore hardness of, in particular no more than, about 75 A to about 80 A. In combination with the at least one conveyor belt, which can be made of a polyvinyl chloride (PVC) on the carrying side and a polyester (PE) fabric on the running side, the friction index, in particular the coefficient of friction p, can be about 0.5 to about 0.6 for a static friction between conveyor belt and friction-enhancing element. Since the friction-enhancing element is softer than the drive pulley, in particular than the casing of the drive pulley, an increase in the friction index between conveyor belt and drive pulley by about 100% to about 400%, for example, can be achieved by using the friction-enhancing element, in particular compared to the friction index between conveyor belt and drive pulley without a friction-enhancing element.

The friction-enhancing element can be attached releasably to the drive pulley, e.g. clamped and/or pushed on, being held by means of its own clamping force and/or dimensional stability, or by means of at least one separate clamping element and/or fastening element. The at least one clamping element can take the form of e.g. a clamping strap or clamping wedge. The at least one fastening element can take the form of e.g. a screw. Thus, the friction-enhancing element can be readily replaced compared to a friction-enhancing element that is fixedly configured on the drive pulley, such as e.g. in the case of a drive pulley coated with a friction coating. In addition, the replacement of the releasably attached friction-enhancing element as a separate component is generally cheaper than a re-coating of the drive pulley, let alone a new coated drive pulley. Since the friction-enhancing element is always subject to wear as operating time increases, this is an economic advantage.

Alternatively, or in addition, at least one friction-enhancing element can be attached fixedly to the drive pulley, particularly in order to meet specific requirements. Thus, for example in the case of increased driving force of the at least one conveyor belt and/or of increased load due to goods to be transported, a reliable attachment of the friction-enhancing element is ensured. A suitable means of attachment in this case can be in the form of an adhesive or a coating of the drive pulley with the material of the friction-enhancing element.

The friction-enhancing element can be in the form of a flat-belt-like, annular, in particular elastic, strip.

The friction-enhancing element can be flush with the casing of the drive pulley or can project beyond the casing of the drive pulley in a radial direction.

At least one receptacle for the friction-enhancing element can be configured on the drive pulley and can be sized for example such that a clamping fit of the friction-enhancing element on the drive pulley is made possible. Thus, an attachment of the friction-enhancing element to the drive pulley at a defined location is created. In addition, a reliable attachment of the friction-enhancing element to the drive pulley is thus created.

In addition to the friction enhancing element that is described above, at least one further friction-enhancing element can be configured on the at least one end pulley. The features for the configuration of the friction-enhancing element on the drive pulley mentioned in this description apply mutatis mutandis to the configuration of the at least one friction-enhancing element on the at least one end pulley.

The receptacle can be configured as at least one annular groove. Thus, a receptacle for the friction-enhancing element can be created by simple means. In particular, the annular groove at least partly surrounds the drive pulley.

An inner side of each of the conveyor belts may comprise a guide strip arranged approximately along the feed direction. The guide strip may engage in a guide groove associated with each guide strip for the lateral guiding of the respective conveyor belt.

The guide strip can be configured continuously or discontinuously approximately along the feed direction. Preferably, the guide strip protrudes substantially vertically from the inner side of each of the conveyor belts.

The guide strip can be configured approximately in the middle of the belt width. Alternatively, the guide strip can be configured outside the middle of the belt width.

One of the guide grooves can be configured in the drive pulley and one in the at least one end pulley. The guide groove can be configured continuously or discontinuously approximately along the feed direction.

In addition, the guide groove associated with the respective guide strip can be configured at least partly in a bed arranged between the drive pulley and the end pulleys. The bed functions to support the at least one conveyor belt. The bed can be configured as a substantially flat surface or as at least one support roller.

A lateral clearance between the respective guide strip and the associated guide groove can be smaller in the bed than in the drive pulley. Thus, the lateral guiding of the respective conveyor belt is ensured by the associated guide groove in the bed. The lateral clearance is configured approximately parallel to a plane of the respective conveyor belt, e.g. a plane of an upper outer side of the respective conveyor belt, and substantially perpendicular to the feed direction. The surface that is provided by the upper outer sides of the conveyor belts can be configured as the feed conveyor surface.

Alternatively, the lateral clearance between the respective guide strip and the associated guide groove can be smaller in the drive pulley than in the bed, in which case the lateral guiding of the respective conveyor belt is ensured by means of the associated guide groove in the drive pulley. Thus, the lateral guiding of the respective conveyor belt is effectively assured over a shorter engagement path between the respective guide strip and the associated guide groove than is the case with the lateral guiding of the respective conveyor belt in the bed, leading to reduced friction and thus reduced wear on the respective guide strip and/or the associated guide groove purely as a result of the reduced engagement path.

Each of the guide strips may be made of a soft material, in particular polyurethane (PU), e.g. PU with a Shore hardness of, in particular no more than, about 65 A. Thus, it is ensured that when the conveyor belt is redirected around the drive pulley and the respective end pulley, at which points its guide strip is compressed, said guide strip is only elastically deformed.

As described above, the guide groove in the drive pulley is made of a hard material, in particular PU, e.g. PU with a Shore hardness of, in particular at least, about 80 D. Thus, somewhat higher friction between the respective guide strip and the associated guide groove is obtained with the above-mentioned compression of the respective guide strip. This friction is adjustable by the above-mentioned lateral clearance between the respective guide strip and the associated guide groove in the drive pulley in such a way that the friction between the respective guide strip and the associated guide groove in the drive pulley is as low as possible and the above-mentioned lateral guiding of the respective conveyor belt by means of the associated guide groove in the drive pulley is ensured. A low coefficient of friction p between guide strip and guide groove has proved advantageous.

One or more receptacles can be arranged on each side of the respective guide groove. Thus, the number and/or position of the friction-enhancing elements can be selected flexibly as required.

The receptacles can be arranged symmetrically to the respective guide groove.

Alternatively, or in addition, one or more receptacles arranged asymmetrically to the respective guide groove can be provided. Thus, a further way is created of making the position of the friction-enhancing elements flexibly selectable as required.

The friction-enhancing element can be of substantially annular configuration and can have a substantially circular or substantially rectangular cross-section. Substantially annular includes e.g. a ring shape or a cylinder shape, wherein the cylinder shape includes a short or long cylinder. Substantially circular includes e.g. an approximately round or an approximately elliptical cross-section. Substantially rectangular includes e.g. an approximately square or an approximately rectangular cross-section or an approximately trapezium-shaped cross-section.

Advantageously, the friction-enhancing element is configured as an O-ring and the annular groove is configured as a receptacle for an O-ring. Thus, a readily obtainable and inexpensive standard part and/or standard component can be used as the friction-enhancing element.

The O-ring can be made of polyurethane (PU), e.g. PU with a Shore hardness of about 75 A to about 80 A. In combination with a conveyor belt that can be made of a polyvinyl chloride (PVC) on the carrying side and a polyester (PE) fabric on the running side, a friction index of about 0.5 to about 0.6 is obtained between conveyor belt and O-ring with the properties and/or advantages as described above.

The guide strip can be a tapered strip. Thus, an unnotched profile is employed which, in principle, offers a longer service life since, as there is no notch effect, no fractures can be expected at the bottom of the profile. Alternatively, or in addition, depending on the application, notched profiles and/or other profile shapes, such as a T-profile, can be employed for the guide strip.

The supply device may have multiple conveyor belts arranged approximately along the feed direction and approximately parallel adjacent to each other. A belt length of the respective conveyor belts can increase from a first lateral end section of the supply device to a second lateral end section of the supply device, in particular as viewed transverse to the feed direction. In particular, the belt length of the respective conveyor belts can increase in steps.

The multiple belts of the supply device can thus have different belt lengths from one another. Thus, on a connecting section of the supply device with which the supply device is connected to the conveyor device, a connecting angle of the supply device to the conveyor device other than about 90° to the feed direction can be achieved and thus a corresponding installation angle of the supply device to the conveyor device can be balanced. The connecting angle may be selected such that it adds up to 90° with the installation angle.

With a favorably selected installation angle of less than 90°, the goods to be transported fed by the supply device to the conveyor device have a velocity element in a conveying direction of the conveyor device that allows a smoother and thus gentler feeding of the goods to be transported from the supply device to the conveyor device. In addition, this offers advantages in terms of floor space because with the supply device installed in this way, the conveyor device is narrower than with an installation angle of about 90°.

The outer sides—in particular the upper outer sides—of the multiple conveyor belts may lie in a common plane. Thus, despite using multiple conveyor belts, a flat surface can be obtained for the feed conveyor surface.

Alternatively, or in addition, the outer sides—in particular the upper outer sides—of the multiple conveyor belts can lie in different planes. In this case, a level of the respective planes is in particular varied continuously, in particular in steps, with the belt length of the respective conveyor belts, in particular as viewed transverse to the feed direction. Advantageously in this case, the bed is adapted to the respective planes.

At least one and/or each of the end pulleys is configured as a tensioning pulley for tensioning or detensioning the respectively associated conveyor belt. A tensioning pulley generally comprises a tensioning apparatus for tensioning or detensioning the associated conveyor belt, an end pulley generally being used exclusively for redirecting the respectively associated conveyor belt. With the advantageous configuration of each of the end pulleys as a tensioning pulley, a necessary tensioning function for the respective conveyor belt is, as it were, integrated into the end pulleys, which are necessary in any case, and an end pulley with a separate tensioning apparatus can be omitted.

The tensioning pulley can be pivoted from a detensioning position to a tensioning position for tensioning the respectively associated conveyor belt. In the detensioning position of the tensioning pulley, the respectively associated conveyor belt is detensioned, the respectively associated conveyor belt being tensioned in the tensioning position of the tensioning pulley.

The tensioning pulley can be pivoted into the detensioning position for assembly or disassembly of the respectively associated conveyor belt. Thus, by means of simple pivoting of the tensioning pulley, the respectively associated conveyor belt is tensioned or detensioned and can be operated, assembled and/or disassembled within a short space of time.

In the tensioning position the respectively associated conveyor belt can exhibit a belt elongation of about 2% to about 8%. Preferably, the respectively associated conveyor belt exhibits a belt elongation of about 5% in the tensioning position. Thus, the above-mentioned simple tensioning or detensioning of the conveyor belt associated with the respective tensioning pulley by simple pivoting of the tensioning pulley is further supported.

While pivoting from the detensioning position to the tensioning position, the tensioning pulley has to pass through a dead center where the belt elongation is greater than the belt elongation in the tensioning position.

In addition, a safety device—in particular a mechanical safety device—can be provided, by means of which the respective tensioning pulley can be locked in its tensioning position, e.g. a pin or screw which can in particular be secured against an unlocking movement, by means of which the pivoting movement of the tensioning pulley can be inhibited.

Another aspect of the invention relates to a method for providing a supply device for the lateral feeding of goods to be transported to a conveyor device, having a drive pulley and at least one end pulley and at least one conveyor belt, wherein each of the end pulleys is associated with one of the conveyor belts, which extends around the drive pulley and the respective end pulley and which is driven by means of the drive pulley, and wherein a friction-enhancing element for enhancing friction between the respective conveyor belt and the drive pulley is arranged on the drive pulley.

The advantages of the method for providing the supply device can be taken, mutatis mutandis, from the features mentioned in relation to the above-mentioned supply device and their advantages.

Exemplary embodiments of the supply device according to the invention are explained in more detail below with reference to drawings.

DETAILED DESCRIPTION

Figure 1:
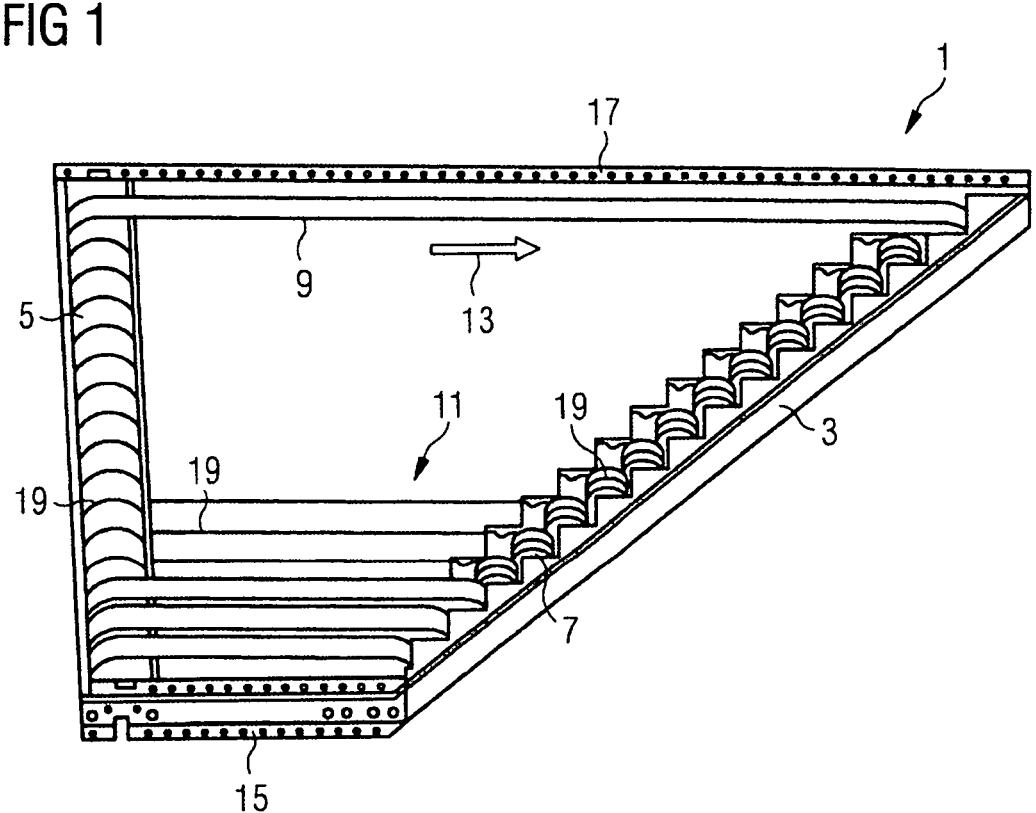
FIG. 1 is a spatial top view of a supply device according to a first exemplary embodiment.

FIG. 1 shows a supply device 1 according to a first exemplary embodiment with a drive pulley 5 arranged in a frame 3 and multiple end pulleys 7, sixteen in this case, each of which is associated with a conveyor belt 9—thus with sixteen conveyor belts 9 in this exemplary embodiment. Between the drive pulley 5 and the end pulleys 7 a bed 11 is arranged. The drive pulley 5, the end pulleys 7 and the bed 11 are mounted on the frame 3.

The conveyor belts 9 are arranged approximately along a feed direction 13 shown by means of an arrow and approximately parallel adjacent to each other. The feed direction 13 points away from the drive pulley 5 towards the end pulleys 7. In this illustration, some of the conveyor belts 9 have been left out so that the construction of the supply device 1 can be seen more clearly; the bed 11 is also shown incompletely. A belt length of the respective conveyor belts 9 increases in steps from a first lateral end section 15 of the supply device 1 to a second lateral end section 17 of the supply device 1 as viewed transverse to the feed direction 13.

On the drive pulley 5, the bed 11 and the end pulleys 7, guide grooves 19 are configured, each of which is associated with a respective conveyor belt 9 and has the purpose of laterally guiding the respective conveyor belt 9. As set out below with reference to FIG. 4, a guide strip 23 which is configured in each case approximately centrally on an inner side 21 of the conveyor belt engages in the guide groove 19 corresponding in position to the respective guide strip 23. The guide strip 23 is configured approximately along the feed direction 13.

The supply device 1 provides a feed conveyor surface for goods to be transported on which the goods to be transported can be conveyed on the conveyor belts 9 in the feed direction 13. The feed conveyor surface is provided by the upper outer sides 43 of the conveyor belts 9. The supply device 1 can be configured e.g. in the manner of a table, in which case the feed conveyor surface is configured as a table surface.

Figure 2:
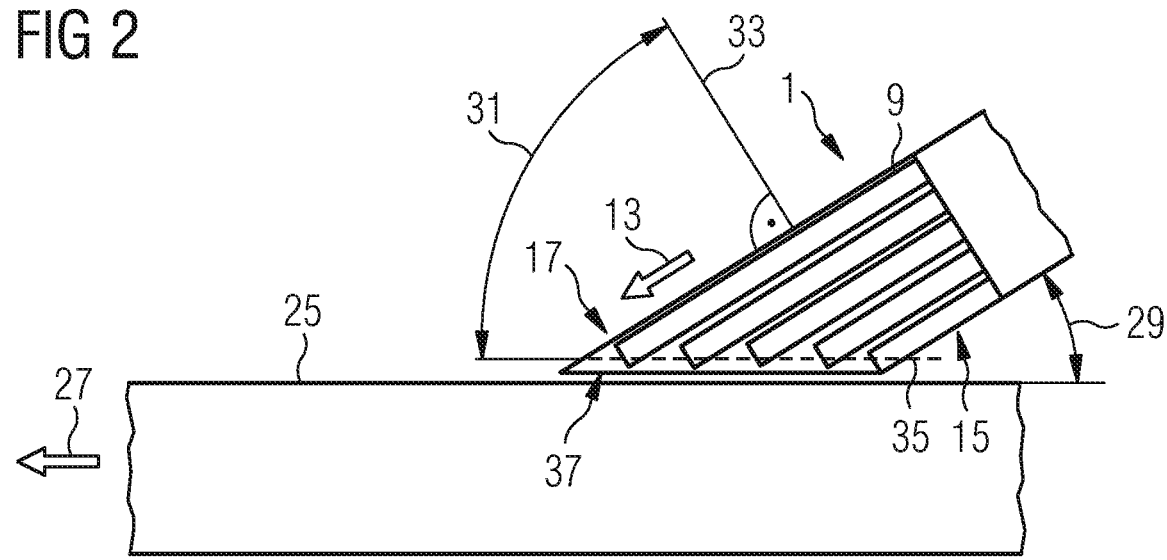
FIG. 2 is a schematic top view of a supply device according to a second exemplary embodiment, which is arranged for feeding goods to be transported to a conveyor device.

FIG. 2 shows a top view of a supply device 1 according to a second exemplary embodiment, which is arranged for feeding goods to be transported to a conveyor device 25. The supply device 1 according to the second exemplary embodiment differs from the supply device 1 according to the first exemplary embodiment in particular in the number of the conveyor belts 9 and the associated end pulleys 7. The supply device 1 according to the second exemplary embodiment comprises five conveyor belts 9 and five associated end pulleys 7.

For space-saving reasons and/or to impart a velocity element in a conveying direction 27 of the conveyor device 25, shown by an arrow, to the goods to be transported to be supplied, the supply device 1 is arranged at an installation angle 29 of less than 90° to the conveyor device 25; in this exemplary embodiment the installation angle 29 is about 30°. The conveying direction 27 is a direction in which goods to be transported can be conveyed on the conveyor device 25.

The different belt lengths of the respective conveyor belts 9 are advantageously configured such that the installation angle 29 adds up to about 90° with a connecting angle 31 of the supply device 1. As a result, the installation angle 29 can be balanced and a uniform transition from the supply device 1 to the conveyor device 25 can be achieved, allowing a gentle feeding of the goods to be transported from the supply device to the conveyor device 25. The connecting angle 31, which is about 60° here, extends between a perpendicular 33 to the feed direction 13 and a connecting line 35, shown as a broken line, of the end pulleys 7 (not shown here). The connecting line 35 runs substantially approximately parallel to the feed direction 13. A connecting section 37 of the frame 3 on the supply device 1, with which the supply device 1 meets the conveyor device 25, is oriented approximately parallel to the connecting line 35 and/or to the feed direction 13.

In FIG. 2, for the sake of clarity, only one supply device 1 is arranged against the conveyor device 27 but multiple supply devices 1 can be arranged against the conveyor device 25, in particular on both sides of the conveyor device 25. Supply devices 1 arranged on opposite sides of the conveyor device 25 are substantially configured as mirror images in relation to the conveying direction 27, in particular with respect to their installation angles 29 and connecting angles 31.

Figure 3:
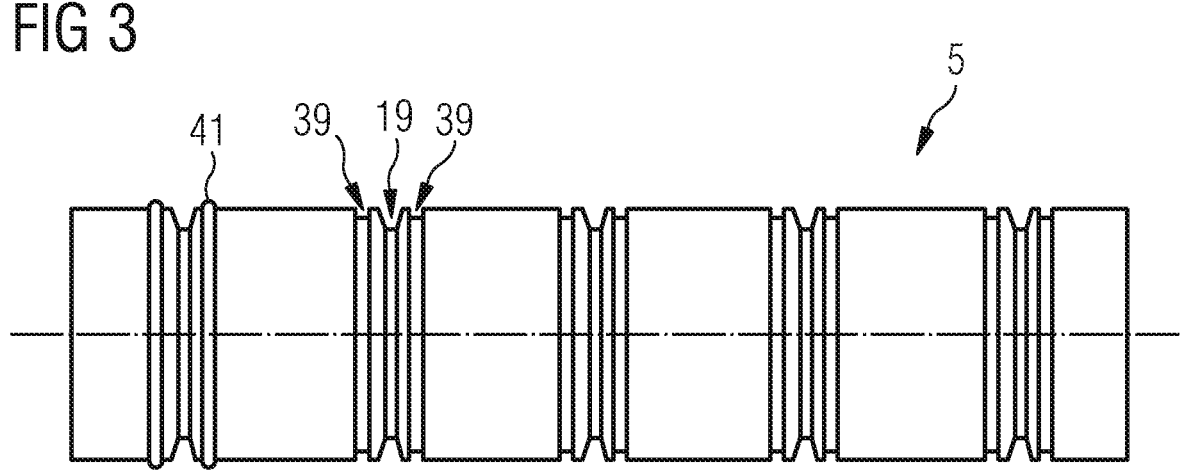
FIG. 3 is an enlarged front view, compared to FIG. 2, of a drive pulley for the supply device according to the second exemplary embodiment.

FIG. 3 shows the drive pulley 5 of the supply device 1 from FIG. 2, in which, in addition to the guide groove 19 described above, receptacles 39 for a friction-enhancing element 41 are provided. On both sides of each guide groove 19 a receptacle 39 is provided, each of which is configured here as a circumferential annular groove. The friction-enhancing elements 41 accommodated in the receptacles 39 are shown here only next to the outermost left-hand guide groove 19. The drive pulley 5 is shown in enlargement compared to FIG. 2.

The friction-enhancing element 41 is configured as an O-ring, which is at least partly accommodated in the receptacle 39 and projects in a radial direction partly beyond the drive pulley 5, or more precisely, beyond a casing of the drive pulley 5. The O-ring here is made of polyurethane (PU) with a Shore hardness of about 75 A to 80 A, which means that there is an increased friction index between the conveyor belts 9 and the O-rings of about 0.5 to about 0.6 compared to the drive pulley. The conveyor belts 9 are each made of a polyvinyl chloride (PVC) on their carrying side and a polyester (PE) fabric on their running side. The O-ring is in physical contact with the respective conveyor belt 9. As a result, a friction, in particular a static friction, between the drive pulley 5 and the respective conveyor belt 9 can be increased.

The guide groove 19 in the drive pulley 5 here is configured as a tapered groove for the guide strip 23 described above configured as a tapered strip (see FIG. 4). The drive pulley 5 is made of polyurethane (PU) with a Shore hardness of about 80 D, which allows low friction between the respective guide strip 23 and the associated guide groove 19 on the drive pulley 5. As a result, wear of the respective guide strip 23 and/or the associated guide groove 19, in particular wear caused by a relative movement between the respective guide strip 23 and the associated guide groove 19, can be reduced.

Figure 4:
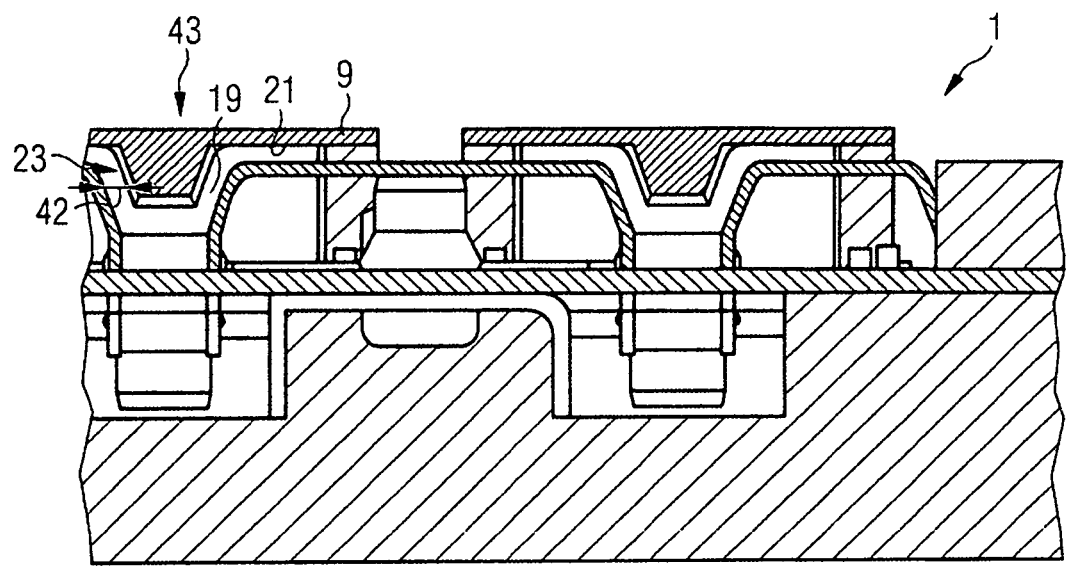
FIG. 4 is an enlarged cross-section, compared to FIG. 2, of a front view of the supply device looking towards the end pulleys.

In the cross-section of a front view of the supply device 1 looking towards the end pulleys 7, as shown in FIG. 4 in an enlargement compared to FIG. 2, the guide strips 23 mentioned above in relation to FIG. 1 can be seen, which are configured on each of the conveyor belts 9 approximately in the middle of the inner side 21 thereof, approximately along the feed direction 13. The guide strips 23 here are configured as tapered strips.

For the lateral guiding of the respective conveyor belt 9, its guide strip 23 engages in a guide groove 19 associated with the respective conveyor belt 9. The guide groove 19 can be configured in multiple parts and can have multiple sections. The guide groove 19 can be configured in sections in the drive pulley 5, the bed 11 and/or the end pulley 7 associated with the respective conveyor belt 9. The arrangement of the guide groove 19 can substantially correspond to the arrangement of the associated guide strip 23, in particular in terms of a direction approximately transverse to the feed direction 13. The respective guide groove 19 can be configured as a tapered groove and can have a cross-section (in a plane perpendicular to the feed direction 13) that is configured such that it is substantially complementary to the guide strip 23 configured as a tapered strip.

A lateral clearance 42 between the respective guide strip 23 and the associated guide groove 19 in the drive pulley 5 can be smaller than in the bed 11, for example, enabling a lateral guiding of the respective conveyor belt 9 to be provided by means of the associated guide groove 19 in the drive pulley 5. The lateral clearance 42 is configured approximately parallel to a plane of the respective conveyor belt 9, e.g. a plane of an upper outer side 43 of the respective conveyor belt 9, and substantially perpendicular to the feed direction 13. The lateral guiding of the respective conveyor belt 9 can thus be provided effectively on a shorter engagement path between the respective guide strip 23 and the associated guide groove 19 than would be the case e.g. with the lateral guiding of the respective conveyor belt 9 in the bed 11. Purely as a result of the reduced engagement path, this can entail reduced friction and thus reduced wear on the respective guide strip 23 and/or the associated guide groove 19.

The respective upper outer sides 43 of the conveyor belts 9 lie in a common plane here, by which the feed conveyor surface can be provided.

Figure 5:
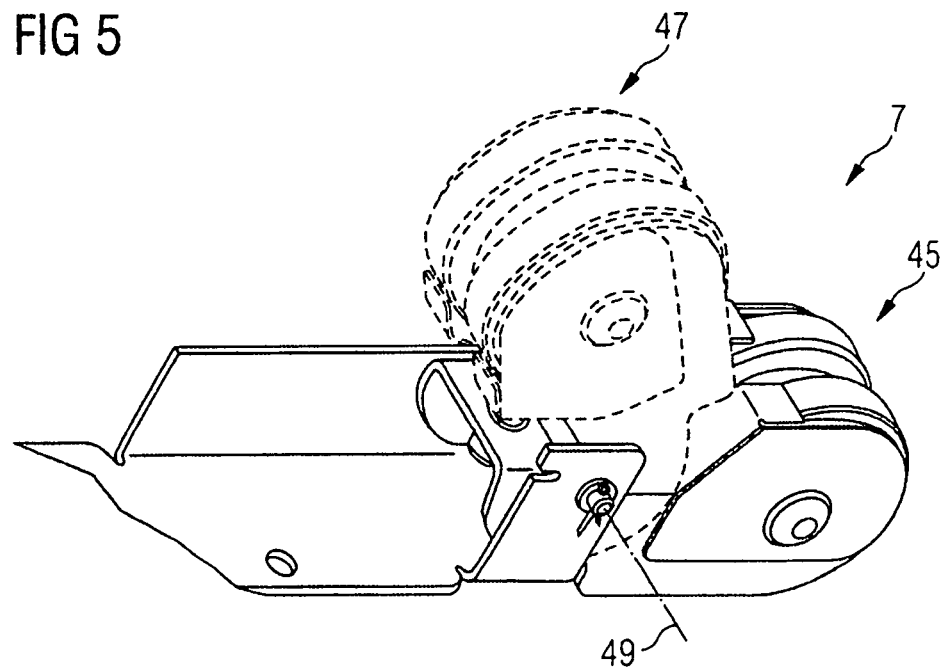
FIG. 5 is a spatial top view of an end pulley designed as a tensioning pulley.

In FIG. 5 an end pulley 7 designed as a tensioning pulley is shown in a spatial top view. A tensioning position 45 of the end pulley 7 is drawn using continuous lines and a detensioning position 47 of the end pulley 7 is drawn using broken lines. The end pulley 7 is pivotable around a pivot axis 49 from the detensioning position 47 to the tensioning position 45. Thus, by means of simple pivoting of the end pulley 7 the respectively associated conveyor belt 9 can be tensioned or detensioned and can be operated, assembled or disassembled within a short space of time.

When pivoting from the detensioning position 47 to the tensioning position 45, the end pulley 7 passes through a dead center (not shown here), where the belt elongation is greater than in the tensioning position.

The design shown here is configured in particular taking account of a pivoting direction of the end pulley 7 from the detensioning position 47 to the tensioning position 45 and a running direction of the associated conveyor belt 9 such that the respective end pulley 7 is held in its tensioning position 45 by means of a force on the end pulley 7 resulting from the belt elongation in the tensioning position 45. In addition, a safety device—in particular a mechanical safety device—can be provided, by means of which the respective end pulley 7 can be locked in its tensioning position 45.

LIST OF REFERENCE CHARACTERS 1 supply device
3 frame
5 drive pulley
7 end pulley
9 conveyor belt
11 bed
13 feed direction
15 first lateral end section of the supply device
17 second lateral end section of the supply device
19 guide groove
21 inner side of the conveyor belt
23 guide strip
25 conveyor device
27 conveying direction
29 installation angle
31 connecting angle
33 perpendicular to the feed direction
35 connecting line
37 connecting section
39 receptacle for friction-enhancing element
41 friction-enhancing element
42 lateral clearance of the guide strip in the guide groove
43 upper outer side of the conveyor belt
45 tensioning position of the tensioning pulley
47 detensioning position of the tensioning pulley
49 pivot axis

The invention claimed is:

1. A supply device for lateral feeding goods to be transported to a conveyor device (25), comprising:
    a drive pulley (5),
    at least one end pulley (7),
    guide grooves (19) formed in the drive pulley (5) and in the at least one end pulley (7), and at least one receptacle (39) arranged on each side of each of the guide grooves (19), and
    at least one conveyor belt (9) that extends around the drive pulley (5) and the associated end pulley (7) and that can be driven by the drive pulley (5), wherein:
    the at least one conveyor belt (9) has an inner side (21) with a guide strip (23) arranged approximately along a feed direction (13), the guide strip (23) engaging in the guide grooves (19) formed in the drive pulley (5) and in the at least one end pulley (7) for laterally guiding the respective conveyor belt (9), and
    friction-enhancing elements (41) mounted respectively in the receptacles (39) on the drive pulley (5) for enhancing friction between the respective conveyor belt (9) and the drive pulley (5).

2. The supply device of claim 1, wherein the friction-enhancing elements (41) are releasably attached to the drive pulley.

3. The supply device of claim 1, wherein each of the receptacles (39) is configured as an annular groove.

4. The supply device of claim 1, wherein the friction-enhancing element (41) has a substantially annular configuration and has a substantially circular or substantially rectangular cross-section.

5. The supply device of claim 1, wherein the guide strip (23) is configured as a tapered strip.

6. The supply device of claim 1, wherein multiple conveyor belts (9) are arranged approximately along the feed direction (13) and approximately parallel adjacent to each other, and wherein a belt length of the respective conveyor belts (9) increases from a first lateral end section (15) of the supply device to a second lateral end section (15) of the supply device.

7. The supply device of claim 1, wherein each of the end pulleys (7) is configured as a tensioning pulley for tensioning the respectively associated conveyor belt (9).

8. The supply device of claim 7, wherein the end pulley (7) can be pivoted from a detensioning position (47) to a tensioning position (45) for tensioning the respectively associated conveyor belt (9), and wherein the end pulley (7) can be pivoted to the detensioning position (47) for the assembly or disassembly of the respectively associated conveyor belt (9).

9. The supply device of claim 8, wherein the respectively associated conveyor belt (9) exhibits a belt elongation of about 2% to about 8% in the tensioning position (45).

10. The supply device of claim 8, wherein the end pulley (7), when pivoting from the detensioning position (47) to the tensioning position (45), passes through a dead center where the belt elongation is greater than the belt elongation in the tensioning position (45).

11. The supply device of claim 3, wherein the guide grooves (19) and the guide strips (23) have tapered cross-sectional configurations and are dimensioned to define lateral clearances (42) between the guide grooves (19) and the respective guide strips (23).

12. A method for laterally feeding goods to be transported to a conveyor device (25), comprising:
providing a drive pulley (5) and end pulleys (7), the drive pulley (50) and each of the end pulleys (7) being formed with a guide grooves (19) and at least the drive pulley (5) further being formed with receptacles (39) on each side of the respective guide grooves (19);
mounting friction-enhancing elements (41) respectively in the receptacles (39) of the drive pulley (5);
providing conveyor belts (9) so that each of the end pulleys (7) is associated with one of the conveyor belts (9), each of the conveyor belts (9) having an inner side (21) with a guide strip (23) arranged approximately along a feed direction (13);
mounting the conveyor belts (9) around the drive pulley (5) and the respective end pulley (7) so that the guide strips (23) engage respectively in the guide grooves (19) of the drive pulley (5) and the end pulleys (7) and so that areas of the inner sides of the respective conveyor belts (9) on opposite sides of the guide strips (23) engage the friction-enhancing elements (41) in the receptacles (39) of the drive pulley (5); and
operating the drive pulley (5) so that the conveyor belts (9) are driven by the drive pulley (5) with the friction-enhancing elements (41) arranged on the drive pulley (5) enhancing friction between the conveyor belt (9) and the drive pulley (5).

* * * * *